March 25, 1930. C. C. LUTZ 1,751,486
ATTACHMENT FOR PLANTERS
Filed July 5, 1927 4 Sheets-Sheet 1

C. C. Lutz Inventor

By CASnow & Co.
Attorneys

March 25, 1930. C. C. LUTZ 1,751,486
ATTACHMENT FOR PLANTERS
Filed July 5, 1927 4 Sheets-Sheet 2
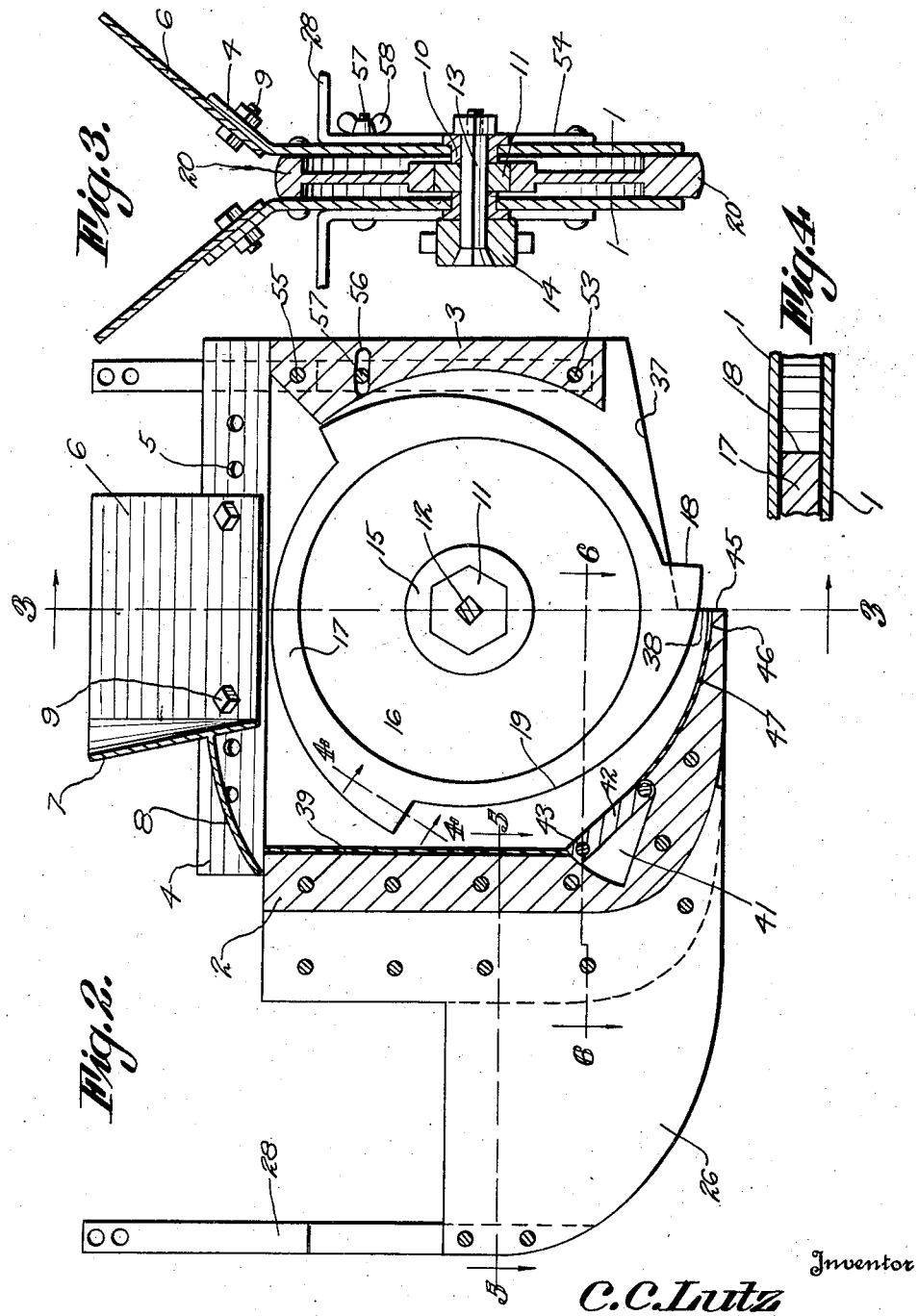

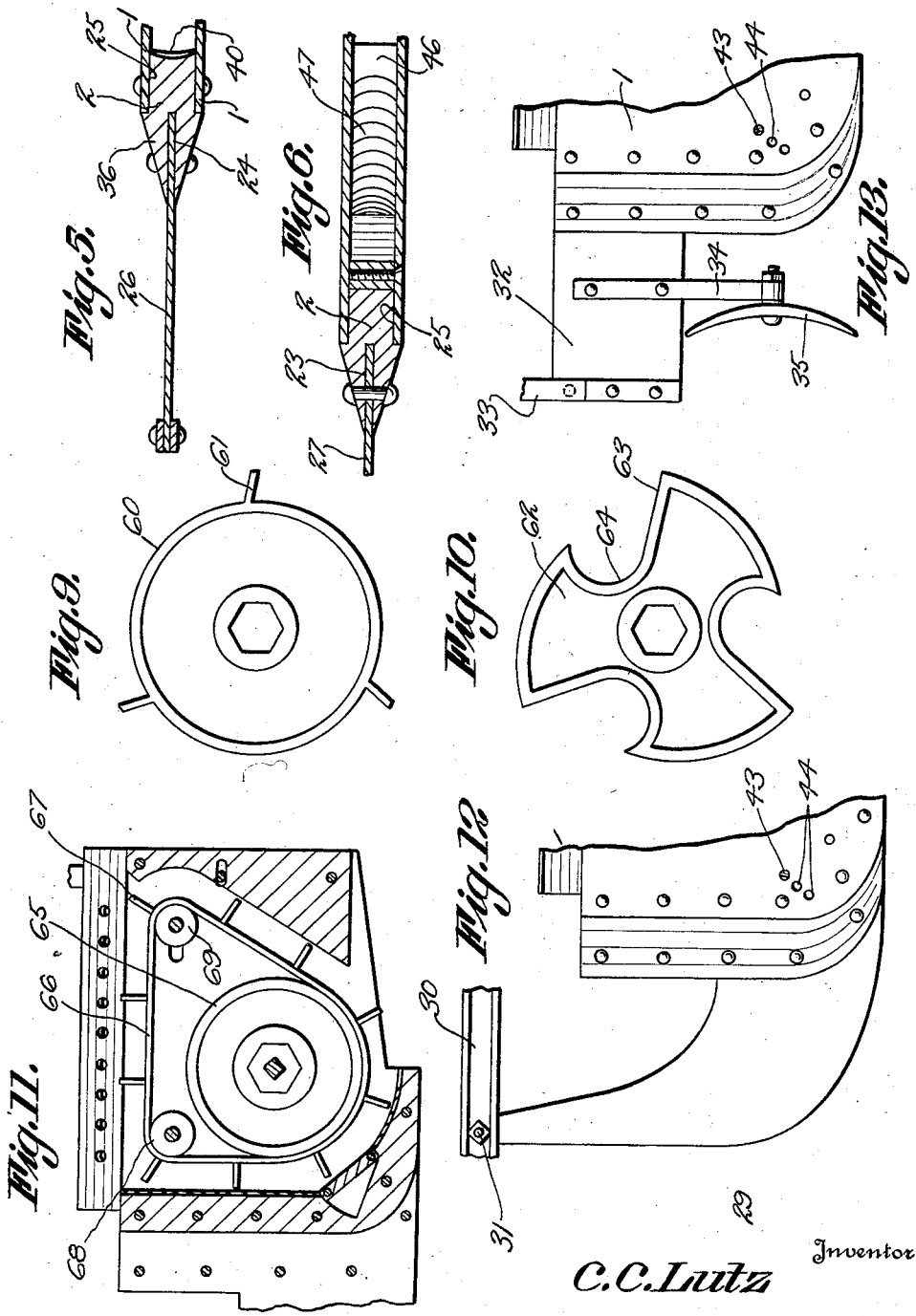

March 25, 1930.  C. C. LUTZ  1,751,486
ATTACHMENT FOR PLANTERS
Filed July 5, 1927  4 Sheets-Sheet 4
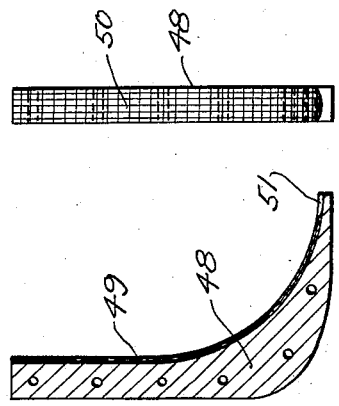
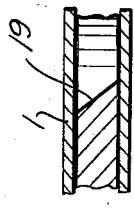
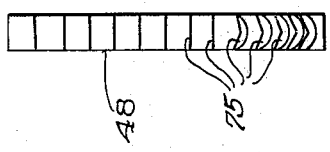
C. C. Lutz Inventor
By C. A. Snow & Co
Attorneys Patented Mar. 25, 1930

1,751,486

UNITED STATES PATENT OFFICE

CLOVIS C. LUTZ, OF CANTON, MISSISSIPPI

ATTACHMENT FOR PLANTERS

Application filed July 5, 1927. Serial No. 203,645.

This invention relates to an attachment for planters and constitutes a continuation in part of an application filed by me on January 31st, 1927, Serial No. 164,842.

Various types of planting attachments have been devised for use in connection with planters but, as far as I am aware, all of them have been open to more or less serious objections when used for planting cotton seed and, more especially, when used for planting the seed in compact clusters or hills. It is well known to those skilled in the art that the best results are obtained by planting cotton seed and, in fact, almost any seed, in compact clusters so that the strength of the severel plants combined will be ample to break through the crust of the soil, and the loss of one or more plants in a hill still leaves a desirable number of plants for cultivation.

It has been impossible, heretofore, to properly deposit cotton seed in compact clusters at regularly spaced intervals because the means utilized for directing the seed from the hopper to the furrow has been so constructed that the downward momentum of the gravitating seed, the forward impulse imparted to the seed by the advancing planter, the suction set up by the movable planting elements, and the lateral scattering of the seed, have all combined to deposit the seed successively rather than in a cluster with the result that instead of producing regularly spaced hills containing compact clusters of seed, the seed have been spread out either laterally or longitudinally of the planter, producing irregular hills in which the seed are so scattered or spaced as to make it difficult for them to break through the crust of the soil and generally require chopping between the hills following the planting operation.

Another objection present in planting attachments heretofore produced has been found in the fact that they are not so standardized as to be used readily in connection with different kinds of planters. In some planters the dropping mechanism combined with the hoppers is lower than in other planters. Some makes of planters have the dropping mechanism located nearer the front of the implements than others. Consequently a planting attachment made for any one of these types could not be used properly with other types of planters.

It is an object of the present invention to provide a standardized construction of planter attachment which can be connected readily to practically all of the principal types of constructions of planters and, after being so attached, can be properly adjusted relative to the dropping mechanism of the planter to insure proper actuation of the mechanism of the attachment for the purposes intended.

Another object is to provide a planter attachment the parts of which cooperate to overcome the objectionable scattering of the seed when it is desired to plant them in compact clusters, said cooperating means including a structure designed to retard the gravitation of the seed while travelling toward the furrow, thereby to maintain the seed in proper position for simultaneous ejection of all of the seed designed for one cluster.

A further object is to provide the attachment with an ejecting element movably mounted close to the bottom of the furrow and operating in timed relation to the supporting wheel or wheels of the planter so that said element will rotate in the same direction as the supporting wheel or wheels of the planter at a peripheral speed equal to the speed of forward movement of the planter, thereby to deposit the clustered seed in the bottom of the furrow without subjecting it to the scattering action that would otherwise result from the momentum due to the forward movement of the planter.

A still further object is to provide a planter attachment utilizing a retarding means for the seed which will counteract the action of suction ordinarily set up by the movable ejecting element thereby further to insure proper positioning of the seed in the path of the advancing ejecting element and to prevent the seed from being delivered prematurely ahead of said element.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred forms of the invention have been shown.

In said drawings,

Figure 2 is a vertical longitudinal section through the planter attachment.

Figure 3 is a section on line 3—3, Figure 2.

Figure 4 is a section on line 4—4, Figure 2.

Figure 5 is a section through the front filler and sword, said section being taken on the line 5—5, Figure 2.

Figure 6 is a section through the filler and a portion of the sword taken on the line 6—6, Figure 2.

Figure 7 is a vertical section through a modified form of front filler.

Figure 8 is a rear elevation thereof.

Figure 9 is a side elevation of a modified form of wheel or ejecting element.

Figure 10 is a side elevation of another form of ejecting element.

Figure 11 is a section through the attachment showing another form of ejecting element.

Figure 12 is a side elevation of a portion of the attachment wherein the sword is connected directly to the frame of the planter.

Figure 13 is a side elevation of a portion of the attachment showing another modified arrangement wherein a forwardly extending bracket is connected to the front filler for engagement by the standard of a furrow opener.

Figure 14 is a section similar to Figure 4 showing a slightly modified form of ejecting element whereby an elongated hill may be planted if desired.

Figure 15 is a view showing in diagram a compact cluster of seed such as planted by this attachment when utilizing the structures illustrated in Figures 1 to 11 inclusive.

Figure 16 is a view showing, in diagram, an elongated hill of seed such as planted by the modified structure shown in Figure 14.

Figure 17 is a view showing, in diagram, drilled seed planted by the use of the attachment shown in Figure 15.

Figure 18 is a rear or face view of another modified form of rear wall or filler using V-shaped instead of bowed retarding webs.

Figure 1:
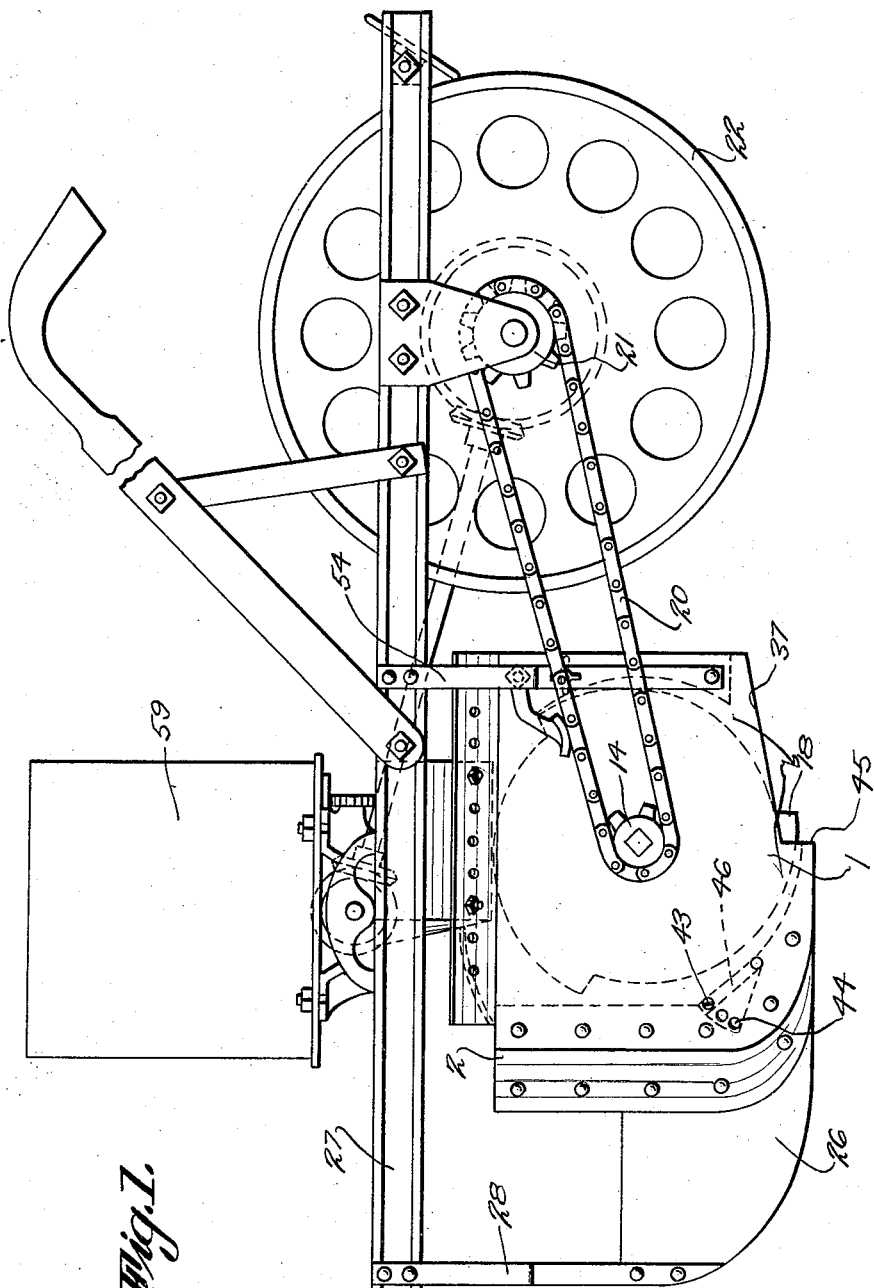
Figure 1 is a side elevation of one form of planter to which is connected the attachment constituting the present invention.

Referring to the figures by characters of reference 1 designates flat side plates of a casing spaced apart at their front edges and at the front portions of their bottom edges by a front wall or filler 2 while a rear filler 3 is utilized for spacing apart the rear edges of the plates. The upper edges of the side plates are flared upwardly to provide upwardly diverging flanges 4 each of which has a longitudinal series of apertures 5. Fitted upon the upper faces of the flanges 4 are the upwardly diverging side walls 6 of a guide chute or funnel 6 open at the back and bottom but provided with a front wall 7. From this front wall is extended a shield 8 designed to bridge the space between the flanges 4 in front of the funnel 6. Bolts 9 or other suitable fastening means can be utilized for detachably securing the sides of this funnel to the apertured flanges 4 and it will be obvious that, after the attachment has been properly connected to a planter this funnel can be adjusted longitudinally to the proper point to receive seeds delivered from the hopper of the planter. Importance is attached to the fact that the sides of the funnel are inclined as they thus constitute means for retarding the gravitation of the seeds deposited in the funnel.

Mounted for rotation within each of the side plates 1 is a sleeve 10 and these sleeves abut against opposed faces of an angular disk 11 interposed between the side plates 1. Both the sleeves and the disk are provided with alining angular openings 12 for the reception of an angular bolt 13 one end of which is seated in and rotatable with the hub of a sprocket 14.

Mounted snugly on the angular disk 11 is the hub 15 of an ejecting element which, in the structure illustrated in Figures 1 to 3, is in the form of a wheel 16 having a thickened rim portion 17 extending close to but out of contact with the side plates 1. The marginal portion of the wheel is formed with abutments 18 regularly spaced about the periphery and each of which is arranged at such an angle that, when it arrives at a point in vertical alinement with and below the center of the wheel, it will incline downwardly and forwardly, the vertical position of the abutment being reached after said abutment has passed rearwardly some distance past the vertical center of the wheel. Said wheel has arcuate peripheral portions 19 extending from the outer end of each abutment 18 to the inner end of the next adjoining abutment and these arcuate peripheral portions are bowed transversely as indicated at 20 in Figure 3. It will also be noted, by referring to Figure 4 that each abutment is extended transversely in a plane at right angles to the sides of the wheel. This is especially important where the seed are to be placed in compact clusters. If, however, it should be desired to place the seeds in elongated clusters as shown for example in Figure 16, the advancing face of each abutment could be obliquely disposed as illustrated for example at 19 in Figure 14.

The sprocket 14 is adapted to be driven by a chain 20 receiving motion from a sprocket 21 rotatable with a wheel 22 of the planter and this wheel 22 as well as wheel 16 will rotate in the same direction. It is to be understood, however, that other mechanism than that described and shown can be utilized for driving the ejecting wheel 16. In any case, however, the mechanism must be so timed that the peripheral speed of the ejecting wheel will be equal to the forward speed of the planter.

A highly important feature of the present invention resides in the peculiar construction of the front filler 2. This filler is secured between the side plates 1 and, in the structure illustrated, has a central vertical slot 23 in the front portion thereof while the sides of the filler are recessed as at 25 to receive the plates 1. In some types of attachments it is desirable to secure a sword 26 in the groove 24 so that the same will extend forwardly therefrom, the front end of the sword being supported from the frame 27 of the planter by a hanger 28. In other types of structures, however, a sword 29 can be extended upwardly and secured directly to the frame 30 of the planter as shown at 31 in Figure 12. In other forms a plate 32 can be secured in the upper portion of the groove 23 and connected to the planter frame by a hanger 33, this plate constituting a bracket to which may be secured the standard 34 of a furrow opener 35. In every instance, however, it is desirable to have the side faces of the front portion of the filler 2 converging forwardly toward the inserted member 26, 29 or 32, as shown at 36 so as to present a wedge-like structure which will easily work within and open out the furrow in advance of the dropping seed.

The lower portion of the filler 2 is curved downwardly and rearwardly and terminates close to the bottom portion of the periphery of wheel 16 directly under the center of the wheel. The thickness of the filler at the bottom is not great because it is desirable to provide as short a drop as possible for the seed when passing from the top surface of the rear end portion of the filler to the bottom of the furrow on which the lower portion of the filler is resting. This structure is clearly illustrated in Figure 2. It might be stated that the side plates 1 are cut away to provide recesses 37 in the rear portions of the bottoms thereof, each recess 37 having an upstanding front wall 38 alining with the rear lower end of the filler 2 and said recesses being of such depth as to expose portions of the abutments 18 and marginal portions 19 during the rotation of the wheel 16. This will be obvious by referring to Figure 2.

In the structure illustrated in Figures 1 to 6 inclusive the filler 2 has the upper portion of its rear face channeled in the direction of its length at 39, this channel being straight from end to end and provided with retarding ribs 40. These ribs can be bowed from one side to the other of the channel with the deepest portions of the bows at the center of the channel, as shown by Figure 5 or, if preferred, the ribs could be V-shaped as at 75, Figure 18. At the lower portion of the straight channeled face of the filler 2 an angular recess 41 may be provided although this recess need not be used under all conditions. In the lower portion of this recess there is pivoted a baffle 42 having smooth faces, the upper portion of the baffle being provided with a fastening means in the form of a screw 43, pin or the like adapted to be seated in any one of a series of apertures 44 in one of the side plates 1. Obviously it is thus possible to adjust the baffle angularly and to hold it in adjusted position. The upper face of the lower portion of the filler 2 is curved gradually downwardly and rearwardly from the baffle 42 to the back end 45 of the filler on a line conforming to the arc of movement of the peripheral edges of the abutments and in wiping relation to said edges, the rearmost portion of this face being smooth as indicated at 46 while the remaining portion is roughened as at 47, this roughened surface being produced by providing ribs as illustrated in Figure 6 and which ribs correspond with those upon the upper straight portion of the filler. In other words the ribs are bowed transversely of the filler as shown by Figure 6, or are V-shaped as in Figure 18 or otherwise constructed to retard seed gravitating along the filler and deflect them toward the center of the roughened face. This lower portion of the filler provided with the ribs can also be channeled in the direction of its length.

As heretofore stated the filler need not be provided with the recess 41 and baffle 42 under some conditions and a modified form of filler without this recess, but longitudinally channeled throughout its length, has been illustrated at 48 in Figures 7 and 8. In other respects this filler is similar to the one already described. In the structure illustrated in these figures, however, the channel 49 in the filler has been shown provided with crossed grooves or serrations 50 instead of curved or angular ribs such as heretofore described. As a matter of fact various other arrangements of ribs, serrations, or other retarding elements can be utilized to advantage in the structure constituting the present invention. It is essential, however, that a smooth surface be left at the delivery end of the filler as illustrated at 46 in Figures 2 and 6 and at 51 in Figure 7.

It is not essential under all conditions to provide ribs or other retarding elements on the upper portion of the filler, this being particularly true where the baffle 42 is employed but nevertheless, it has been found advantageous at times to use the roughened portion 40 as well as the baffle.

Arranged between the rear portions of the side plates 1 is a rear filler indicated at 3, this filler terminating at its lower end a short distance above the recesses 37 in the side plates. A bolt 53 is extended transversely through the side plates and the lower portion of the filler 3 and is also extended through the lower ends of hangers 54 arranged upon the outer faces of the plates 1. The upper portion of the filler 3 is secured between the side plates at 55 and formed within the filler and the side plates is a short slot 56 concentric with the bolt 53 and receiving a clamping bolt 57. This bolt is carried by the hangers 54 and is adapted to be tightened by means of a nut 58 thereby to hold the hangers and side plates against relative movement after adjustment.

It will be understood that by constructing the attachment as described the same can be used in connection with various types of planters, the hangers 54 and 28 providing efficient adjustable connections between the attachment and the frame of the planter while the adjustable funnel 6 insures proper direction of the release seed from the planter into the attachment.

Assuming that the attachment has been properly connected to a planter so that the feed will be delivered from the hopper 59 of the planter into the funnel 6, the machine is propelled forwardly in any preferred manner and as it thus travels the wheel 16 will be rotated. It is desired, as before explained, primarily to deposit the seed in compact clusters at regularly spaced intervals but, as far as I am aware no efficient means have thus far been devised whereby cotton seed, with the lint adhering thereto, can be planted automatically in this way. This has been due to the fact that the light fluffy seed had been easily thrown or scattered because of the momentum of the machine and because of the momentum resulting from the fall of the seed from the hopper of the planter to the furrow. The seed have also been difficult to control because the suction set up by the operating mechanism has tended to prevent them from clustering properly. In the present structure, however, the seed will be dropped by the usual mechanism provided therefor in a continuous thin stream, these seed gravitating from the hopper 59 onto the inclined walls of the funnel 6. These walls are so pitched as to materially retard the gravitation of the seeds so that they will be properly spread out along the periphery of the upper portion of the wheel 16 as it rotates under the funnel. During this rotation each abutment 18 of the wheel will travel into the outlet or neck of the funnel so as to keep it clear. As the seed are carried forwardly by the wheel they will tend to slip off of the periphery thereof and slide downwardly within the channel in the upper portion of the front filler 2. If this channel is provided with serrations or ribs, the fibers on the seed will come against these retarding elements so that the seed will gravitate at reduced speed and be prevented from racing away from the advancing abutment 18. If the baffle 42 is used, it can be set at such an angle that the seed, when dropped to position thereon, will be momentarily retarded so as not to move away from the advancing baffle 18 following them. Finally the seed will move onto the ribs or other retarding elements at 47 on the lower portion of the filler and will be carried rearwardly by the lowermost abutment and caused finally to slide easily over the smooth surface 46 and off of the end of the filler. As the abutment is travelling at a speed equal to the forward speed of the planter but in a direction opposite thereto, the momentum due to the forward movement of the planter is nullified and as the seed are ejected solely by the pressure of the abutment thereagainst and have no momentum due to gravitation, all of the seed in front of each abutment and which have been gathered together in a compact cluster or wad through the retarding influence of the filler or the baffle or both, will be deposited on the bottom of the furrow and there left to form a compact hill.

To prevent the upper seeds of a wad from being lifted away from the outlet by the abutment, said abutment is inclined downwardly and forwardly at the point of delivery whereby it will freely pass from all of the seed of the deposited cluster during the forward cycloidal movement of the abutment. This inclined abutment is also advantageous because it effects a wiping action along the lower edge of the side plates thereby to keep them clear from débris. Furthermore during the movement of this abutment downwardly and rearwardly relative to the front filler, the inclined advancing face tends to press the seed against the filler as they travel downwardly, thereby producing a wad.

A rapidly rotating wheel will of course set up a certain amount of suction which would tend to blow the light seed rearwardly. The retarding ribs or projections and the retarding baffle, if used, will more than offset this action of the air currents. Thus it has been found in practice that, by utilizing an attachment such as described cotton seed delivered from the hopper 59 in a substantially continuous stream can be accurately delivered in compact wads or clusters at regular intervals.

By providing the shield 8 the rotatable wheel will not be able to throw any of the seed upwardly and forwardly out of the attachment and, therefore, waste is reduced to the minimum. As the seeds are accurately clustered and deposited, and the parts are all properly timed, all of the hills will contain practically the same number of seed and the waste heretofore resulting from scattering of the seed either laterally or longitudinally will be eliminated. It might be added that by having the wheel slightly spaced from the side plates 1 a large amount of the suction ordinarily resulting from the rotation of wheel 16 is eliminated because air is permitted to enter freely through the side spaces.

As has already been explained, should it be desired to deposit the seed in an elongated cluster it merely becomes necessary to provide obliquely disposed abutments as shown at 19 in Figure 14. By utilizing abutments of this type, the seed, instead of being deposited as shown in Figure 15 will be deposited as shown in Figure 16.

While it is preferred to use a wheel such as shown, for example, in Figure 2 other types of ejecting elements can be employed. For example a wheel 60 having peripheral paddles 61 might be employed as shown in Figure 9 or a wheel 62 having abutments 63 merging into rounded pockets 64 could be utilized, this form of wheel being shown in Figure 10. This latter form of wheel would be advantageous because it would provide pockets 64 in which the seed would be held in clusters just prior to reaching the lower portion of the filler at which time they would gravitate from the inverted pocket holding them. Still another form of ejecting element has been illustrated in Figure 11. This includes a wheel 65 engaged by an endless belt 66 from which paddles 67 are extended. Guide wheels 68 and 69 are provided for the belt and one of these wheels, 69, can be adjusted to take up slack in the belt. Obviously with this arrangement the length of the belt can be varied and the blades 67 can be placed at different distances apart to deposit seed at desired intervals.

By having the funnel 6 open at the back the operator of the planter can view the contents of the funnel at all times and can also readily observe the working of the wheel to determine whether the seed are being properly fed thereto.

While the device has been described primarily for use in planting cotton seed it is to be understood that it can also be used for planting other kinds of seed.

The peculiar construction of the attachment enables it to be used with all kinds of planters, the parts being adjustable to provide ample clearance for the different types of mechanisms used.

What is claimed is:

1. The combination with a planter, of an attachment including a casing having an outlet in the back portion of the bottom thereof, a rotatable ejecting element within the casing provided with a series of radial seed impelling abutments and having its lower portion movable oppositely to the direction of movement of the planter, means for actuating said element at a peripheral speed equal to the forward speed of the planter, and means on an inner surface of the casing for maintaining the seed in front of and in substantial engagement with the abutments.

2. The combination with a planter, of an attachment including a casing having an outlet in the back portion of the bottom thereof, a rotatable ejecting element in the casing having outstanding peripheral seed impelling abutments movable successively into the outlet, means for directing seed onto the ejecting element, and means on an inner surface of the casing for maintaining the seed in front of and in contact with the adjacent abutment.

3. The combination with a planter, of a casing connected thereto having an outlet in the back portion of the bottom thereof, an ejecting element mounted for rotation in the casing having outstanding peripheral abutments, means operated by the forward movement of the planter for rotating the ejecting element to move the lower portion thereof rearwardly at a peripheral speed equal to the forward speed of the planter and in wiping relation to an inner surface of said casing, means for feeding seed onto the ejecting element, and means on said inner surface of the casing for retarding the movement of the seed towards said outlet, thereby to maintain the seed in front of and in contact with the adjacent abutment.

4. An attachment for planters including a casing having an arcuate inner surface and an outlet in the rear portion of the bottom thereof, an ejecting element mounted for rotation in the casing having outwardly extending peripheral abutments, the outer edges of which pass over said arcuate surface, and means in the casing for retarding the outward movement of the seed to maintain them close to the advancing or ejecting faces of the abutments.

5. An attachment for planters including a casing having an arcuate inner surface and an outlet in the rear portion of the bottom thereof, an ejecting element mounted for rotation in the casing having outwardly extending peripheral abutments movable in wiping relation to said surface, and means formed on said surface for retarding the outward movement of the seed to maintain them close to the advancing or ejecting faces of the abutments, said means including a roughened area upon that face of the casing nearest the lower portion of the downward path of movement of the abutments.

6. An attachment for planters including side plates, front and rear walls spacing the plates, an ejecting element mounted for rotation between the walls having outstanding peripheral abutments, said abutments being movable downwardly and rearwardly relative to the front wall and upwardly relative to the rear wall, said front wall being contiguous to the path of the outer edges of said abutments and terminating substantially in vertical alinement with the center of the ejecting element, there being an outlet between the lower ends of the walls, and means upon the front wall for retarding the movement of seeds thereover to maintain them close to the respective descending abutments and in advance thereof.

7. An attachment for planters including side plates, front and rear walls interposed therebetween providing an outlet between their lower ends, an ejecting element mounted for rotation between the walls, the lower portion of the front wall extending beneath and terminating under the ejecting element, close to the path of the ejecting element, that surface of the front wall nearest the ejecting element having a roughened portion and a smooth delivery end portion.

8. An attachment for planters including side plates, front and rear walls interposed therebetween providing an outlet between their lower ends, an ejecting element mounted for rotation between the walls, the lower portion of the front wall extending beneath and terminating under the ejecting element close to the path of the ejecting element, that surface of the front wall nearest the ejecting element having a roughened seed retarding portion and a smooth delivery end portion, and an angularly adjustable baffle carried by the front wall constituting a supplemental seed retarding means.

9. The combination with a planter having means for delivering seed therefrom, of an attachment including a casing open at the top and having an outlet in the rear portion of the bottom thereof, downwardly and rearwardly movable ejecting means supported within the casing extending into the inlet and outlet, and means for retarding the descent of seed from the planter to the outlet, said means including a funnel having downwardly converging walls opening into the top of the casing and means in the casing adjacent the path of the downwardly and rearwardly movable ejecting means for engaging and holding back the descending seed to maintain them in position for forceful actuation by the ejecting means to the outlet of the casing.

10. The combination with a planter having means for delivering seed therefrom, of an attachment including a casing open at the top and having an outlet in the rear portion of the bottom thereof, downwardly and rearwardly movable ejecting means supported within the casing extending into the inlet and outlet, and means for retarding the descent of seed from the planter to the outlet, said means including a funnel having downwardly converging walls opening into the top of the casing and means in the casing adjacent the path of the downwardly and rearwardly movable ejecting means for engaging and holding back the descending seed to maintain them in position for forceful actuation by the ejecting means to the outlet of the casing, and means controlled by the forward movement of the planter for imparting to the lower delivery portion of the ejecting means a rearward peripheral speed equal to the forward speed of the planter.

11. The combination with a planter, of a casing connected thereto having an outlet in the back portion of the bottom thereof, an ejecting element mounted for rotation in the casing having outstanding abutments movable successively across the outlet, means for directing seed onto the ejecting element into the paths of the abutments, means in the casing extending under and terminating beneath the ejecting element at the front end of the outlet for retarding gravitation of seed to maintain them close to and in front of the adjacent abutments, for forceful delivery by the abutments to the outlet, and means controlled by the forward movement of the planter for imparting to the lower portion of the ejecting element a backward peripheral speed equal to the forward speed of the planter, each of said abutments being disposed at such an angle relative to the ejecting element as to place the seed through the outlet and leave them undisturbed.

12. In a planter, the combination with the seed dispensing means, of a second drop mechanism comprising a seed receiving casing provided with an outlet in its base and having a bottom wall terminating at said outlet, an ejecting element in the casing including a seed impelling abutment positioned to wipe the surface of the bottom wall, means for moving the abutment rearwardly over said surface at a speed corresponding to the forward traveling movement of the planter, and means on said surface for restraining movement of impelled seeds towards the outlet.

13. A seed depositing attachment for planters comprising a seed receiving body adapted to be secured beneath the seed container of a planter, a rotatable element forming a part of said body and having radially extended members forming seed propelling abutments, a forward wall on the body having its lower portion curved longitudinally on the arc described by the radially extended members, the curved portion of said wall terminating at the under side of the body to form a seed outlet, the inner surface of said curved portion being fashioned to retard gravitational movement of seed thereover towards said outlet, the radial members wiping the curved surface of said wall to sweep seeds thereon towards said outlet.

In testimony that I claim the foregoing as my own, I have hereto affixed my signature.

CLOVIS C. LUTZ.

CERTIFICATE OF CORRECTION.

Patent No. 1,751,486.                      Granted March 25, 1930, to

CLOVIS C. LUTZ.

It is hereby certified that error appears in the printed specification of the above numbered patent requiring correction as follows: Page 5, line 120, claim 4, strike out the word "in" and insert instead "on said surface of"; and that the said Letters Patent should be read with this correction therein that the same may conform to the record of the case in the Patent Office.

Signed and sealed this 22nd day of April, A. D. 1930.

(Seal)                                                              M. J. Moore,
Acting Commissioner of Patents.